(12) United States Patent
Grethel et al.

(10) Patent No.: US 7,318,594 B2
(45) Date of Patent: Jan. 15, 2008

(54) ACTIVE ROLL STABILIZATION SYSTEM

(75) Inventors: Marco Grethel, Bühlertal (DE); Manfred Homm, Bühl-Neusatz (DE); Michael Reuschel, Ottersweier (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/492,713

(22) Filed: Jul. 25, 2006

(65) Prior Publication Data

US 2007/0013151 A1    Jan. 18, 2007

Related U.S. Application Data

(63) Continuation of application No. PCT/DE2005/000006, filed on Jan. 7, 2005.

(30) Foreign Application Priority Data

Jan. 28, 2004    (DE) .................. 10 2004 004 475

(51) Int. Cl.
    *B60G 21/073* (2006.01)
(52) U.S. Cl. ..................... 280/124.106; 280/124.16
(58) Field of Classification Search ......... 280/124.106, 280/124.157–124.161
    See application file for complete search history.

(56) References Cited

U.S. PATENT DOCUMENTS

| | | | |
|---|---|---|---|
| 5,199,854 A * | 4/1993 | Aoyama ............... 417/282 |
| 5,735,540 A | 4/1998 | Schiffler ............... 280/5.501 |
| 6,575,484 B2 * | 6/2003 | Rogala et al. ......... 280/124.158 |
| 6,669,216 B1 * | 12/2003 | Elser et al. ........... 280/124.106 |
| 6,786,492 B2 * | 9/2004 | Brandenburger ......... 280/5.519 |
| 2003/0020252 A1 * | 1/2003 | Stanfield ............... 280/124.161 |
| 2003/0047898 A1 | 3/2003 | Nagy et al. ............. 280/124.157 |
| 2004/0090019 A1 | 3/2004 | Germain ............... 280/5.502 |
| 2005/0146098 A1 * | 7/2005 | Green et al. ............. 280/5.508 |

FOREIGN PATENT DOCUMENTS

| | | |
|---|---|---|
| EP | 1 379 399 A1 | 1/2004 |
| JP | 09156338 | 6/1997 |
| WO | WO 03/101768 A1 | 12/2003 |
| WO | WO 2004/085178 A1 | 10/2004 |

* cited by examiner

*Primary Examiner*—Paul N. Dickson
*Assistant Examiner*—Leonard McCreary, Jr.
(74) *Attorney, Agent, or Firm*—Alfred J. Mangels

(57) ABSTRACT

An active roll stabilization system of a vehicle having an axle with at least two wheels, wherein the axle is provided with a roll stabilizer that is actuated by means of a hydraulic device. The hydraulic device is actuated and controlled by at least one pressure control valve with a preselected pressure level by a pressure supply device, such as a pump. In order to reduce the costs for producing such an active roll stabilization system, the pressure control valve is pilot-operated by a pressure control pilot valve.

19 Claims, 6 Drawing Sheets

ACTIVE ROLL STABILIZATION SYSTEM

CROSS-REFERENCE TO RELATED APPLICATION

This is a continuation of International Application Serial No. PCT/DE2005/000006, with an international filing date of Jan. 7, 2005, and designating the United States, the entire contents of which is hereby incorporated by reference to the same extent as if fully rewritten.

BACKGROUND OF THE INVENTION

1. Field of the Invention

The present invention relates to an apparatus for active roll stabilization of a vehicle, with at least one axle having at least two wheels, which axle is provided with a transverse stabilizer that is operable with the help of a hydraulic apparatus that can be subjected to a pre-selected pressure level, through at least one pressure limiting valve, by means of a pressure supply unit, such as a pump.

2. Description of the Related Art

Such roll stabilization devices are also referred to as anti-roll systems or roll stabilization systems. In conventional anti-roll systems, directly controlled pressure-limiting and directional valves are employed.

An object of the invention is to provide an apparatus for active roll stabilization of a vehicle, with at least one axle having at least two wheels, which axle is provided with a transverse stabilizer that is operable with the help of a hydraulic apparatus that can be subjected to a pre-selected pressure level through at least one pressure limiting valve, by means of a pressure supply unit such as a pump, which can be produced economically.

SUMMARY OF THE INVENTION

The object is achieved with an apparatus for active roll stabilization of a vehicle, with at least one axle having at least two wheels, which axle is provided with a transverse stabilizer that is operable with the help of a hydraulic apparatus that can be subjected to a pre-selected pressure level through at least one pressure limiting valve, by means of a pressure supply unit, such as a pump. The at least one pressure limiting valve is controlled by a pilot valve. In conjunction with the present invention, it was discovered that the magnet coils used for direct activation of the pressure limiting valves in conventional anti-roll systems cause a not-insignificant part of the cost. In comparison, the present invention offers the advantage that economical pilot valves that are available on the market can be used.

The object mentioned above is achieved with an apparatus for active roll stabilization of a vehicle, with at least two axles having at least two wheels, each axle of which is provided with a transverse stabilizer. The transverse stabilizers are operable with the help of hydraulic devices that can be subjected to various pressure levels by a pressure supply unit, such as a pump, through pressure limiting valves. The pressure limiting valves assigned to the hydraulic devices are pilot-controlled by at least two pressure limiting pilot valves connected in series. The series connection of the pressure limiting pilot valves provides the advantage that an additional inlet orifice which would otherwise be necessitated by the pilot circuit can be dispensed with.

A preferred exemplary embodiment of the roll stabilization apparatus is characterized in that a direction switching valve, for example a 7/2 directional valve that is used for direction-dependent switching of the hydraulic devices, is pilot-controlled by a direction switching pilot valve. That makes it possible to reduce the manufacturing costs further.

A further preferred exemplary embodiment of the roll stabilization apparatus is characterized in that a fail-safe valve, which is pilot-controlled by a fail-safe pilot valve, is connected between the direction switching valve and one of the hydraulic devices. That makes it possible to further reduce the manufacturing costs.

A further preferred exemplary embodiment of the roll stabilization apparatus is characterized in that a direction switching valve, for example a 7/2 directional valve that is used for direction-dependent switching of the hydraulic devices, and a fail-safe valve that is connected between the direction switching valve and one of the hydraulic devices, are pilot-controlled by a single on/off pilot valve. The advantage here consists partly in the elimination of an additional point of leakage in a pilot circuit, and partly in the elimination of an additional pilot valve.

A further preferred exemplary embodiment of the roll stabilization apparatus is characterized in that the on/off pilot valve has three switching positions. In the first state of the on/off pilot valve neither the direction switching valve nor the fail-safe valve is switched on. In the second state of the on/off pilot valve only the fail-safe valve is switched on, and in the third state of the on/off pilot valve both the fail-safe valve and the direction switching valve are switched on. The direction switching valve and the fail-safe valve are preferably spring-loaded directional valves with two switching positions. In the first state the on/off pilot valve can be electrically un-powered. Then both the direction switching valve and the fail-safe valve are in their home position, in which they are held, for example, by a pre-tensioned spring, as long as a directional valve used to operate the magnet is un-powered. In the second state, a medium voltage is applied to the on/off pilot valve so that the pilot pressure overcomes the pre-tensioning of the spring of the fail-safe valve, and the fail-safe valve switches from its home position to a second position. At the medium voltage the resulting pressure force on the direction switching valve is sufficient to overcome the latter's stronger pre-tensioning, so that the direction switching valve remains in its home position. When a higher voltage is applied to the direction switching valve, and hence to the higher pressure, the direction switching valve is also switched from its home position to a second position. The fail-safe valve remains in its second position.

A further preferred exemplary embodiment of the roll stabilization apparatus is characterized by a pressure reducing valve, which sets the pilot pressure level to, for example, 5 bar. The total pilot pressure valve is operated parallel to the pressure limiting valves for the actuators.

A further preferred exemplary embodiment of the roll stabilization apparatus is characterized in that the total pilot pressure reducing valve is subjected to the pressure from a tank from which the pressure supply unit is supplied. The intentional returning of the tank pressure to the spring chamber of the total pilot pressure reducing valve causes the total pilot pressure to be raised by the amount of the tank pressure level, so that a regulating differential pressure of, for example, 5 bar is available. That enables the influence of the tank pressure level on the pilot circuit to be eliminated.

A further preferred exemplary embodiment of the roll stabilization apparatus is characterized in that the pressure limiting valves and/or the direction switching valve and/or the fail-safe valve are subjected to the pressure from a tank from which the pressure supply unit is supplied. The intentional returning of the tank pressure to the spring chamber of the pressure limiting valve, the direction switching valve, and/or the fail-safe valve, causes the total pilot pressure to be raised by the amount of the tank pressure level, so that a regulating differential pressure of, for example, 5 bar is available.

A further preferred exemplary embodiment of the roll stabilization apparatus is characterized in that all of the valves include valve pistons that are guided in a cast valve block in which channels are cast for supplying hydraulic medium and/or conducting it away. Conventional valves for motor vehicle use are constructed using so-called plug-in construction. There the valve piston is guided in a valve sleeve which is firmly connected to a magnet. The valve sleeve, in turn, is inserted into a valve block against which it is sealed with the help of O-rings. By guiding the valve piston directly in the valve block, both the valve sleeve and the O-rings can be dispensed with.

A further preferred exemplary embodiment of the roll stabilization apparatus is characterized in that various valves are connected with each other through cast channels. That has the advantage that complex and expensive reworking can be eliminated.

A further preferred exemplary embodiment of the roll stabilization apparatus is characterized in that valve actuator elements, control elements, sensor elements, hydraulic elements, and/or electronic elements, of a plurality of valves are combined in one unit and are shielded against the surroundings by one protective cover, in particular a protective pan. The protective cover offers the advantage that complicated and cost-intensive individual protection of the magnets and sensors can be eliminated. The protective cover shields the control elements from the outside, and at the same time ensures that no hydraulic medium escapes into the environment.

A further preferred exemplary embodiment of the roll stabilization apparatus is characterized in that the individual control elements, sensor elements, hydraulic elements, and/or electronic elements, are directly connected with each other electrically. By eliminating a cable tree with its multiplicity of plug-in connections, not only are the manufacturing costs reduced but the system reliability is also significantly increased. Internal cabling in the controller is not necessary, thanks to direct contacting of magnets, sensors, and the connector plug with the electronics. The sensors, for example pressure and displacement sensors, do not need housings, amplifiers, and evaluation units of their own.

BRIEF DESCRIPTION OF THE DRAWINGS

Additional advantages, characteristics, and details of the invention are evident from the following description, in which various embodiments are described in detail with reference to the drawings. The characteristics mentioned in the claims and in the description can be essential to the invention individually or in any combination. The figures show the following:

DESCRIPTION OF THE PREFERRED EMBODIMENTS

Figure 1:
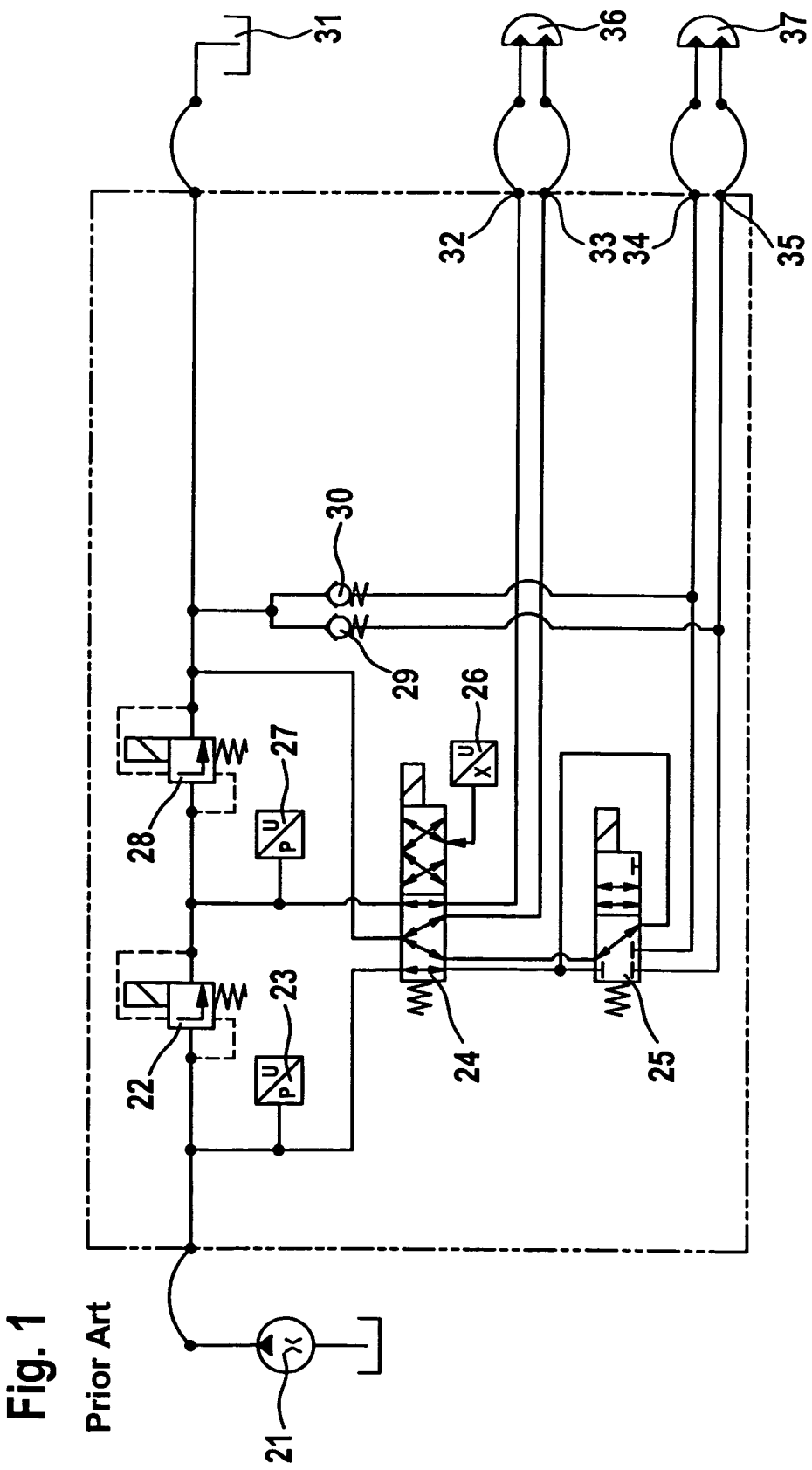
FIG. 1: a hydraulic circuit diagram of a conventional roll stabilization apparatus.

FIG. 1 shows the actual state of a standard system. The pressure supply unit is a suction-restricted radial piston pump 21 that supplies two different pressure levels through a cascade connection by means of two proportional pressure limiting valves 22 and 28, which are connected as pressure differential valves. The pressure levels are monitored by pressure sensors 23 and 27. For a turning motor 37 on the stabilizer on the front axle these pressure ranges are designated as 35 for the right side and 34 for the left side respectively; for a turning motor 36 on the stabilizer on the rear axle they are designated accordingly as 33 and 32. The pressure on the rear axle must always be lower than the pressure on the front axle. These two pressure levels are switched when rounding curves, to the right or left depending on the direction, by means of a 7/2 directional valve 24, which is also referred to as a direction switching valve, so that with synchronization the pressure in the turning motors is increased or reduced on either the right or the left side of the vehicle. The operation of direction switching valve 24 is monitored with the help of a switching position detection sensor 26. In addition, in the front axle hydraulic line there is a fail-safe valve 25 whose function is to block the turning motor 37 of the front axle and switch the turning motor 36 of the rear axle to zero pressure in a fail-safe case if a valve jams or if the electric power fails. In addition, two feeder valves 29 and 30 are installed, which can connect pressure regions 35 and 34 of turning motor 37 on the front axle with the tank line and tank 31 in such a way that restricted free turning of turning motor 37 can occur via the leakage points in the turning motor itself through feeding of the volumetric and without cavitation problems.

Proportional pressure limiting valves 22 and 28 and 7/2 and 3/2 directional valves 24 and 25 are directly controlled valves. A not insignificant part of the costs is caused by the magnet coils used for control. To ensure the requisite actuating power for the valves, quite large and expensive magnet coils are utilized. For that reason, in conjunction with the present invention consideration was given to replacing the direct control of the valves with pilot control. The great advantage is the availability of economical pilot valves.

Figure 2:
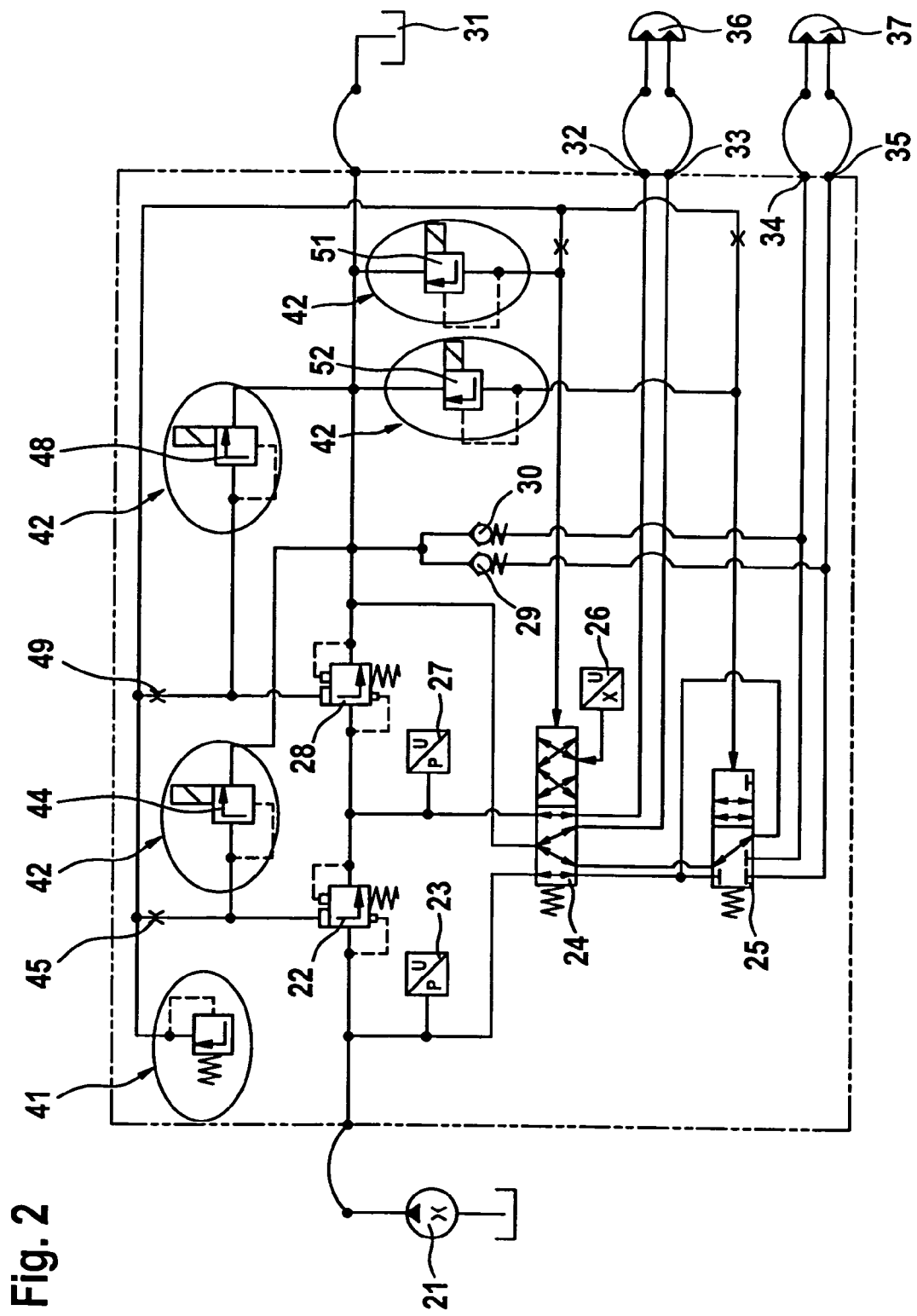
FIG. 2: a hydraulic circuit diagram of a roll stabilization apparatus according to the invention, with valves controlled by pilot valves.

In the exemplary embodiment illustrated in FIG. 2 the direct magnets were replaced with pilot valves 42. In addition, a pressure reducing valve 41 was connected after pump 21 to provide the total pilot pressure. The hydraulic circuit diagrams shown in FIGS. 1 through 4 are similar. The same reference numerals are used to designate the same parts. To avoid repetitions, reference should be made to the preceding description of FIG. 1. In the following description only the differences between the individual embodiments will be described.

In FIG. 2 a pressure limiting pilot valve 44 and an inlet orifice 45 are connected ahead of pressure limiting valve 22. A pressure limiting pilot valve 48 and an inlet orifice 49 are connected ahead of pressure limiting valve 28. A direction switching pilot valve 51 is connected ahead of direction switching valve 24. A fail-safe pilot valve 52 is connected ahead of fail-safe valve 25. Along with the availability of economical pilot valves, the exemplary embodiment illustrated in FIG. 2 offers the advantage that higher actuating forces may be able to operate on the main valves, which increases the reliability of operation. In addition, the pilot valves can be activated by smaller magnets, which because of their lower power consumption do not place such a heavy load on the on-board network as do the direct magnets traditionally used. However, investigations conducted in conjunction with the present invention on the roll stabilization apparatus illustrated in FIG. 2 found elevated system leakage, which has a detrimental effect on the overall efficiency and/or the dynamics of the system. Furthermore, the tank pressure, which can be as much as 15 bar at low temperatures, can influence the functioning of the pilot circuit significantly. These problems were eliminated by the exemplary embodiments depicted in FIGS. 3

Figure 3:
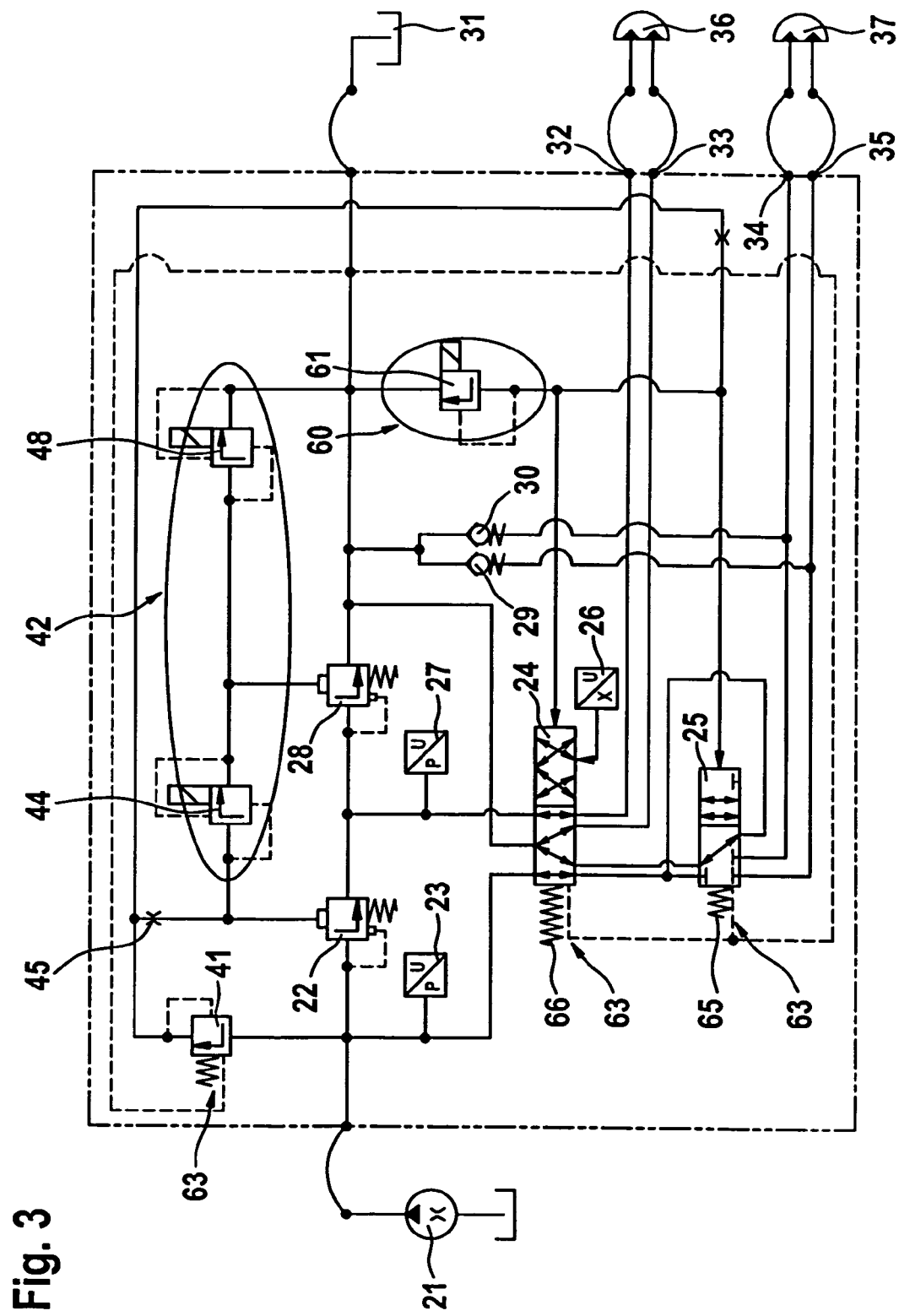
FIG. 3: a hydraulic circuit diagram of a roll stabilization apparatus according to the invention, with two pressure limiting pilot valves connected in series.

In FIG. 3 one can see within an ellipse 42 that pressure limiting pilot valves 44 and 48 are connected in series, in a departure from the exemplary embodiment depicted in FIG. 2. That has the advantage that in the pilot circuit a parallel oil stream via the supply orifice 49 (FIG. 2), which represents a "point of leakage" due to the pilot circuit, can be dispensed with. Within an ellipse 60 a single on/off pilot valve 61 is shown, which replaces the two pilot valves 51 and 52 of FIG. 2.

Pilot valve 61 has three discrete switch positions. When no power is applied the two directional valves 24 and 25 are not switched. When a medium voltage is applied to on/off pilot valve 61, the pilot pressure overcomes the pre-tensioning of a spring 65 on fail-safe valve 25, so that fail-safe valve 25 switches to its second position (not shown in FIG. 3). At this medium voltage the resulting pressure force on direction switching valve 24 is not yet sufficient to overcome the stronger pre-tensioning of a spring 66. Consequently, direction switching valve 24 remains unswitched, i.e., in the position shown in FIG. 3. When a higher voltage is applied to on/off pilot valve 61 the higher pre-tensioning force of spring 66 is overcome by the higher pilot pressure, and direction switching valve 24 switches to its second switch position (not shown in FIG. 3). At the same time, fail-safe valve 25 remains in its second position.

In FIG. 3, arrows 63 and the associated dashed lines also indicate that the tank pressure is conducted back into the spring chambers of pressure reducing valve 41 and directional valves 24, 25. The returning of the tank pressure to the spring chamber of pressure reducing valve 41 ensures that the total pilot pressure is always raised by the level of the tank pressure, so that a regulating differential pressure of, for example, 5 bar is available. The same is true of the two directional valves 24, 25.

Figure 4:
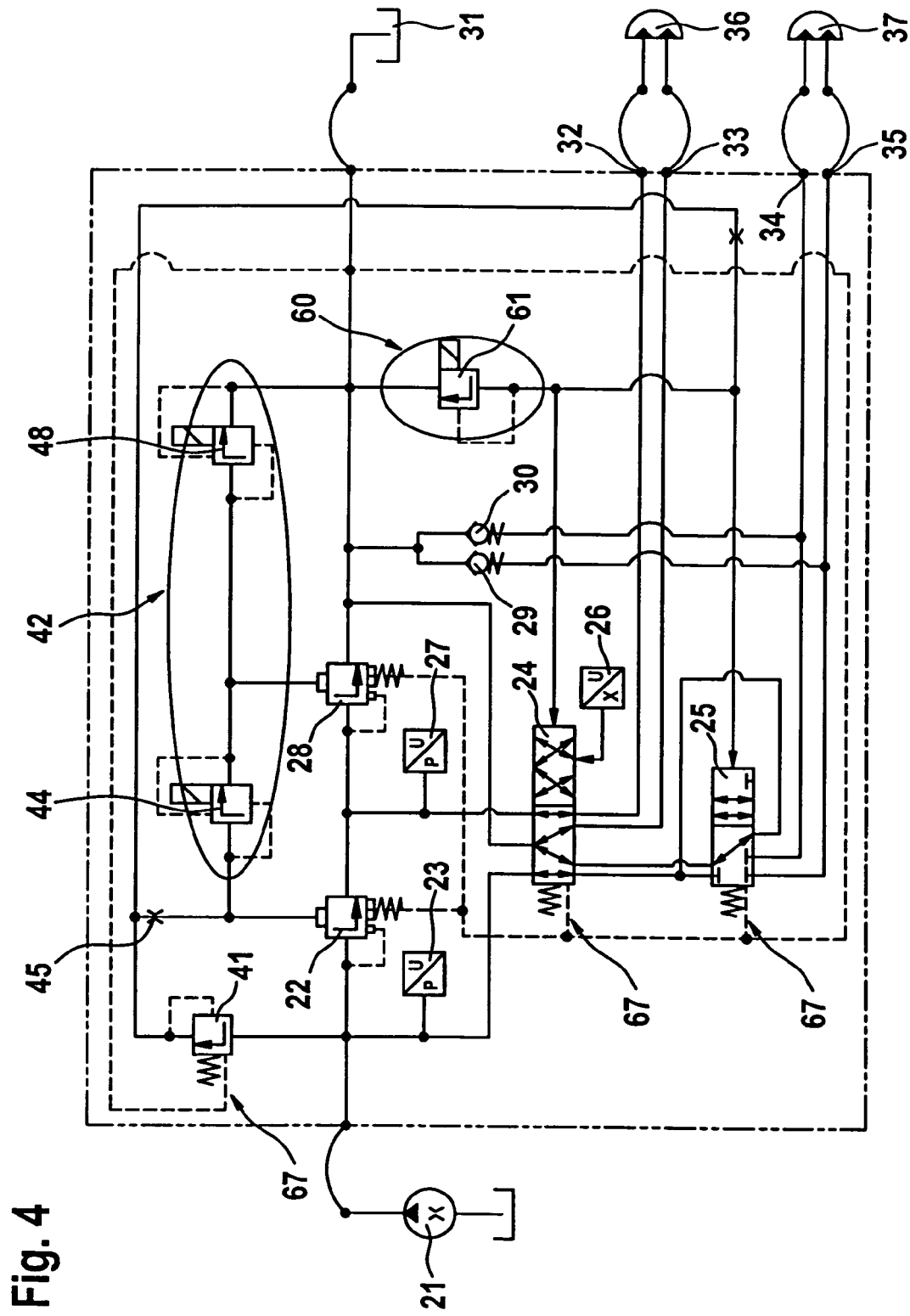
FIG. 4: a hydraulic circuit diagram of a roll stabilization apparatus according to the invention, with intentional returning of tank pressure.

In FIG. 4, arrows 67 and the associated dashed lines indicate that the tank pressure is fed back not only to pressure reducing valve 41 and directional valves 24, 25, but also to pressure limiting valves 22, 28.

Figure 5:
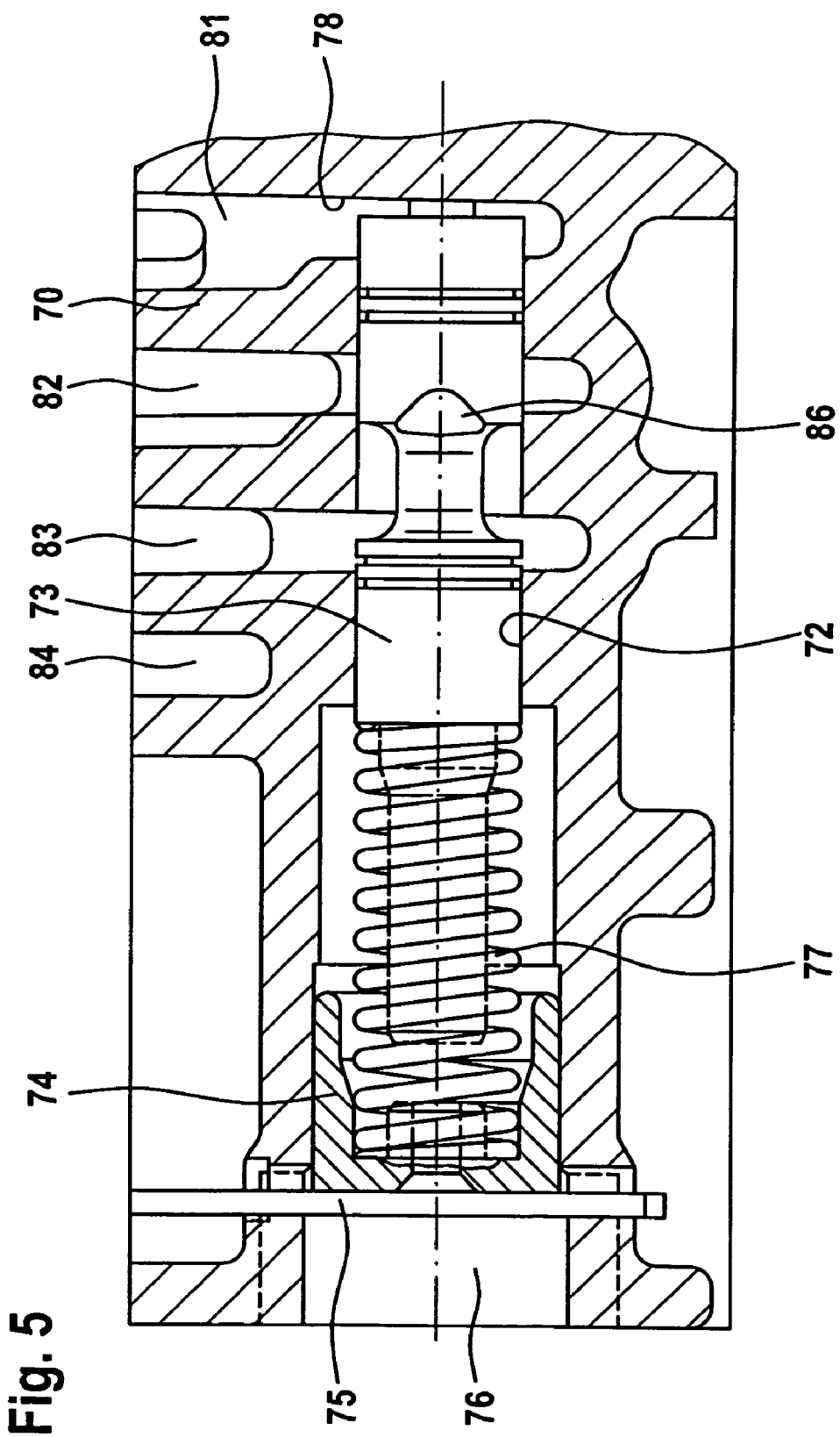
FIG. 5: a longitudinal section through a valve housing with a valve piston guided in it.

FIG. 5 shows a cross-sectional view of a die cast aluminum housing 70. A blind bore 72 is recessed in aluminum die cast housing 70, in which a valve piston 73 is received so that it can move back and forth. Blind bore 72 is closed with the help of a plug 74, which is held in blind bore 72 by a holding plate 75. On the side of holding plate 75 facing away from valve piston 73 there is a receiving space 76 for a magnet (not shown). Holding plate 75 and/or plug 74 can also be formed by the magnet. Furthermore, plug 74 and holding plate 75 can be integrated into the magnet. Valve piston 73 is held by the biasing force of a helical compression spring 77 against a stop surface 78 that forms the inner end of blind bore 72.

Four passageways 81, 82, 83, 84 that run transversely to the longitudinal axis of valve piston 73 are recessed in aluminum die cast housing 70, which is also referred to as the valve housing. Passageway 81 serves to recycle leakage. Passageway 82 forms a connecting conduit to a pump (element 21 in FIGS. 1 through 4). Passageway 83 forms a drainage conduit, for example to a pressure limiting valve (elements 22, 28 in FIGS. 1 through 4). Passageway 84 represents, for example, a connecting conduit to an additional pilot valve.

The valve shown in FIG. 5 can be, for example, a pressure limiting pilot valve, as shown in FIGS. 2 through 4 and designated as elements 22 and 28. The pilot pressure is applied to valve piston 73 via passageway 81. In the position of valve piston 73 shown in FIG. 5, the hydraulic medium, under the pilot pressure, passes via passageway 82 and an indentation 86 that is formed on valve piston 73, into drainage passageway 83, which is connected to one of the pressure limiting valves (elements 22, 28 in FIGS. 2 through 4). If the pilot pressure in passageway 81 overcomes the biasing force of spring 77, or if valve piston 73 is moved away from stop surface 78 with the help of a magnet, then the connection between passageways 82 and 83 is interrupted. The so-called labyrinth solution of the several flow conduits shown in FIG. 5 gives the advantage that valve piston 73 runs directly into valve housing 70. A plurality of valves are connected with each other through cast conduits.

Figure 6:
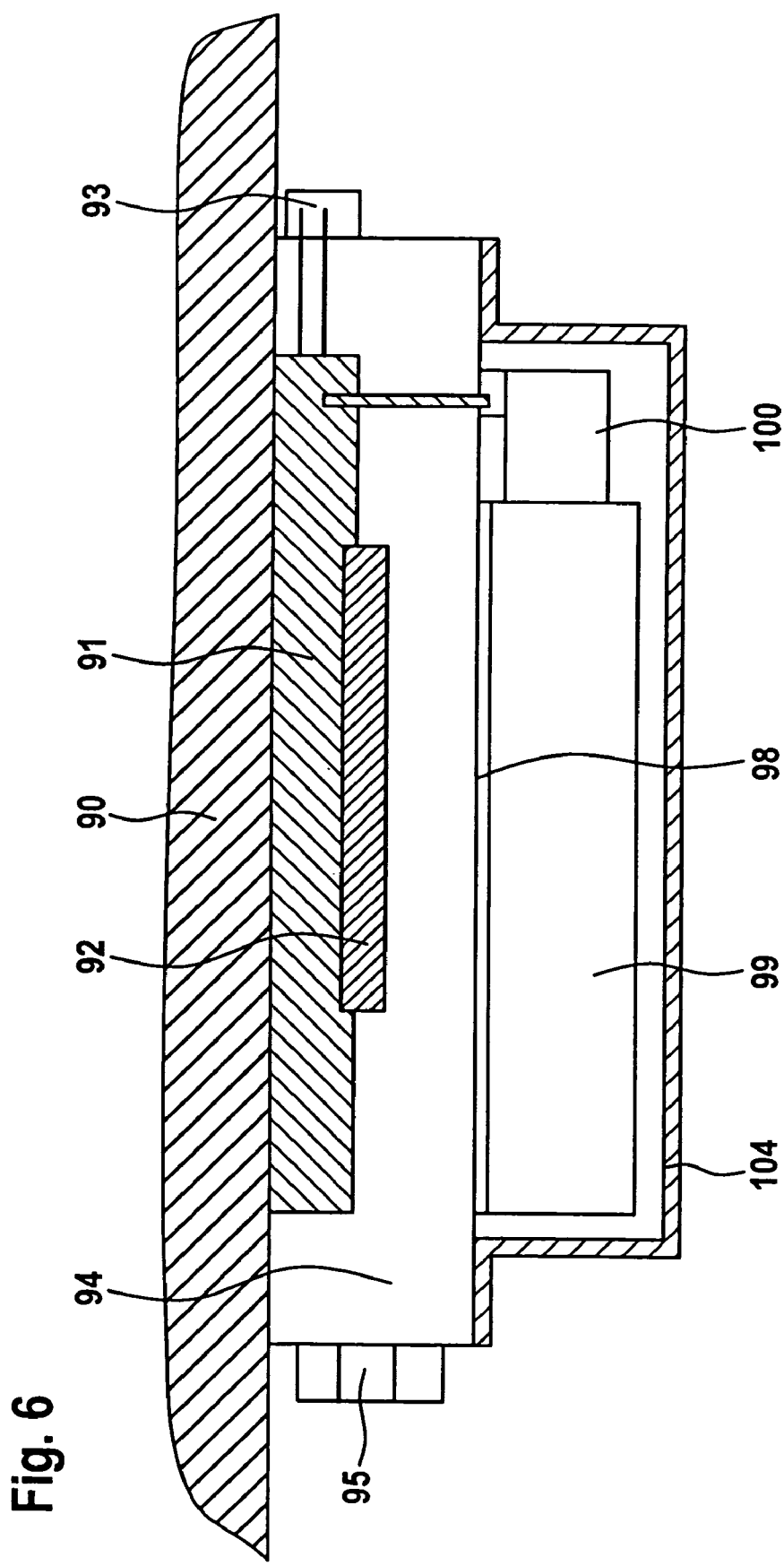
FIG. 6: a schematic depiction of a roll stabilization control apparatus according to the invention, in sectional view.

In FIG. 6 a vehicle boundary surface is designated as 90. Electronic elements 91 of a roll stabilization control apparatus are installed directly on the vehicle boundary surface. Sensor elements 92 are installed directly on the electronic elements 91. A connector plug 93 is connected directly to the electronic elements 91. A first control plate 94, which is formed in the labyrinthine manner of the flow conduits of an aluminum die cast housing part, contains conduits and connections, in particular hydraulic connections 95 for the valves. A second control plate 99 is separated from first control plate 94 by an intermediate plate 98. Second control plate 99 contains actuators and magnets 100 of the valves. The electronic elements, sensor elements, and control plates are shielded against the outside by a protective plate 104, which is also referred to as a protective pan. That offers the advantage that the respective components do not have to be encased individually. Protective pan 104 shields the control elements against the outside, and at the same time it ensures that no oil escapes into the environment. The direct contacting of the individual elements with each other offers the advantage that a complex cable tree with a multitude of plug connections can be eliminated. That not only reduces the costs, but also significantly increases the reliability of the system.

What is claimed is:

1. Apparatus for active roll stabilization of a vehicle including at least one axle having at least two wheels, which axle is provided with a transverse stabilizer that is operated by a hydraulic device that is subjected to a pre-selected pressure level, said roll stabilization apparatus comprising: at least one pressure limiting valve and a pressure supply source operatively connected with the at least one pressure limiting valve, wherein the pressure limiting valve is pilot-controlled by a pressure limiting pilot valve, and including a two-position direction-switching valve for direction-dependent switching of the hydraulic devices, wherein the two-position direction switching valve is pilot-controlled by a single direction-switching pilot valve.

2. Roll stabilizing apparatus according to claim 1, including a total pilot pressure reduction valve connected between the pressure supply source and the pressure limiting pilot valve and parallel to the pressure limiting valve.

3. Roll stabilizing apparatus according to claim 2, wherein the total pilot pressure limiting valve is subjected to pressure from a tank from which the pressure supply source is supplied.

4. Roll stabilizing apparatus according to claim 1, wherein all of the valves include valve pistons that are guided in a cast valve housing in which passageways are cast for supplying hydraulic medium to and for conducting it away from the respective valves.

5. Roll stabilizing apparatus according to claim 4, wherein the valves are connected with each other through the cast passageways.

6. Roll stabilizing apparatus according to claim 4, wherein the cast valve housing is of die cast aluminum.

7. Roll stabilizing apparatus according to claim 1, wherein actuator elements, control elements, sensor elements, hydraulic elements, and electronics elements for operating and controlling a plurality of valves are combined in one unit.

8. Roll stabilizing apparatus according to claim 7, wherein the unit is shielded from the environment by a protective covering.

9. Roll stabilizing apparatus according to claim 8, wherein the protective covering is a protective plate.

10. Roll stabilizing apparatus according to claim 7, wherein the individual control elements, sensor elements, hydraulic elements, and electronics elements are directly connected with each other electrically.

11. Roll stabilizing apparatus according to claim 1, wherein the pressure supply source is a pump.

12. Apparatus for active roll stabilization of a vehicle including at least two axles having at least two wheels, which axles are provided with a respective transverse stabilizer operated by respective hydraulic devices that are subjected to different pressure levels, said roll stabilizing apparatus comprising: a pair of pressure limiting valves and a pressure supply source operatively connected with the pressure limiting valves, wherein the pressure limiting valves associated with respective hydraulic devices are pilot-controlled by at least two pressure limiting pilot valves connected in series, and including a two-position direction-switching valve for direction-dependent switching of the hydraulic devices, wherein the two-position direction switching valve is pilot-controlled by a single direction-switching pilot valve.

13. Roll stabilizing apparatus according to claim 12, including a fail-safe valve connected between the direction switching valve and one of the hydraulic devices, wherein the fail-safe valve is pilot-controlled by a fail-safe pilot valve.

14. Roll stabilizing apparatus according to claim 12, including a direction switching valve for direction-dependent switching of the hydraulic devices, and a fail-safe valve connected between the direction switching valve and one of the hydraulic devices, wherein the direction switching valve and the fail-safe valve are pilot-controlled by a single on/off pilot valve.

15. Roll stabilizing apparatus according to claim 14, wherein the on/off pilot valve has three switching states, wherein in a first state of the on/off pilot valve neither the direction switching valve nor the fail-safe valve is switched on, wherein in a second state of the on/off pilot valve only the fail-safe valve is switched on, and wherein in a third state of the on/off pilot valve both the fail-safe valve and the direction switching valve are switched on.

16. Roll stabilizing apparatus according to claim 14, wherein the direction switching valve is a 7/2 directional valve.

17. Roll stabilizing apparatus according to claim 12, wherein at least one of the pair of pressure limiting valves and the direction switching valve and the fail-safe valve is subjected to a pressure from a tank from which the pressure supply source is supplied.

18. Roll stabilizing apparatus according to claim 12, wherein the pressure supply source is a pump.

19. Roll stabilizing apparatus according to claim 12, wherein the direction switching valve is a 7/2 directional valve.

* * * * *